US009018154B2

(12) United States Patent
Blondel

(10) Patent No.: US 9,018,154 B2
(45) Date of Patent: Apr. 28, 2015

(54) THICKENER CONTAINING A CATIONIC POLYMER AND SOFTENING COMPOSITION CONTAINING SAID THICKENER, IN PARTICULAR FOR TEXTILES

(71) Applicant: Frederic Blondel, Lezigneux (FR)

(72) Inventor: Frederic Blondel, Lezigneux (FR)

(73) Assignee: S.P.C.M. SA (FR)

( * ) Notice: Subject to any disclaimer, the term of this patent is extended or adjusted under 35 U.S.C. 154(b) by 59 days.

(21) Appl. No.: 14/064,856

(22) Filed: Oct. 28, 2013

(65) Prior Publication Data

US 2014/0047649 A1  Feb. 20, 2014

Related U.S. Application Data

(60) Division of application No. 13/683,919, filed on Nov. 21, 2012, now abandoned, which is a continuation of application No. PCT/FR2011/051208, filed on May 27, 2011.

(51) Int. Cl.
*C11D 3/37* (2006.01)
*C11D 3/00* (2006.01)
*C08F 220/34* (2006.01)

(52) U.S. Cl.
CPC ............. *C11D 3/001* (2013.01); *C11D 3/0015* (2013.01); *C11D 3/3773* (2013.01); *C08F 220/34* (2013.01)

(58) Field of Classification Search
CPC ....... C11D 1/008; C11D 3/001; C11D 3/0015
USPC .......................................... 510/506, 522, 527
See application file for complete search history.

(56) References Cited

U.S. PATENT DOCUMENTS

| | | | |
|---|---|---|---|
| 4,454,060 A | 6/1984 | Lai et al. | |
| 5,114,600 A | 5/1992 | Biggin et al. | |
| 5,686,024 A | 11/1997 | Dahanayake et al. | |
| 6,271,192 B1 | 8/2001 | Verstrat et al. | |
| 6,864,223 B2 | 3/2005 | Smith et al. | |
| 2004/0052746 A1 | 3/2004 | Tamareselvy et al. | |
| 2012/0114571 A1* | 5/2012 | Klug et al. | 424/59 |

FOREIGN PATENT DOCUMENTS

| | | |
|---|---|---|
| EP | 0172723 B1 | 2/1986 |
| EP | 0172724 B1 | 2/1986 |
| EP | 1099749 A2 | 5/2001 |
| EP | 1449862 A1 | 8/2004 |
| WO | 9012862 A1 | 11/1990 |
| WO | 9722640 A1 | 6/1997 |
| WO | 9736981 A1 | 10/1997 |
| WO | 2005053748 A1 | 6/2005 |
| WO | 2005087188 A1 | 9/2005 |
| WO | 2008036587 A2 | 3/2008 |
| WO | 2010078959 A1 | 7/2010 |

OTHER PUBLICATIONS

Publication Research Disclosure No. 429116, from Jan. 2000; "Cationic Polymeric Thickeners Useful in Fabric Softeners"; Disclosed Anonymously; 1 page.
International Search Report Application No. PCT/FR2011/051208 Completed: Sep. 8, 2011; Mailing Date: Sep. 16, 2011 4 pages.

* cited by examiner

*Primary Examiner* — John Hardee
(74) *Attorney, Agent, or Firm* — St. Onge Steward Johnston & Reens LLC

(57) ABSTRACT

A method for softening laundry employs a softening composition, which includes at least one thickener containing a cationic polymer obtained by polymerization:
of a cationic monomer;
of a monomer with a hydrophobic nature, of formula (I):

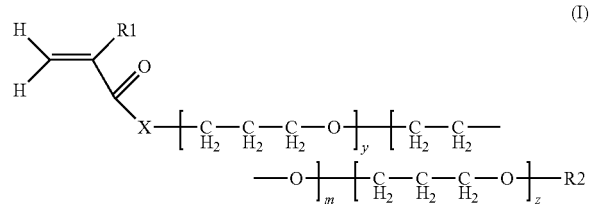

wherein
R1=H or $CH_3$
R2=alkyl chain having at least 16 carbon atoms
X=O, m≥5, y=z=0, or
X=NH, m≥z≥5, y=0, or
X=NH, m≥y≥5, z=0,
of a nonionic monomer.

16 Claims, No Drawings

THICKENER CONTAINING A CATIONIC POLYMER AND SOFTENING COMPOSITION CONTAINING SAID THICKENER, IN PARTICULAR FOR TEXTILES

This is a divisional of U.S. application Ser. No. 13/683,919, filed Nov. 21, 2012, now abandoned.

FIELD OF THE INVENTION

The present invention relates to a thickener/stabilizer, in particular used in softening compositions for laundry. It is a cationic polymer obtained by polymerization of cationic monomers and of monomers with a hydrophobic nature.

BACKGROUND OF THE INVENTION

The use of such thickeners in softening compositions makes it possible to improve their rheological profile and therefore to modify the properties of the softening formulation. Moreover, the role of the softener is to provide a much more pleasant feel by lubrication of the animal textile fibres (wool in particular) and plant textile fibres (cotton) and of the synthetic fibres after treatment. It also provides antistatic properties by reducing the friction between fibres, it provides sensations of freshness by virtue of the fragrances incorporated, and it makes it possible to bring out the colours and to facilitate ironing.

In the remainder of the description and in the claims, the expression "thickener" is intended to mean, without implied distinction, thickener and/or stabilizer Document WO 90/12862 describes a softening composition comprising a cationic polymer which acts as a thickener. This polymer is very lightly crosslinked in the presence of from 5 to 45 ppm of a crosslinking agent comprising polyethylenic functions.

Document U.S. Pat. No. 6,864,223 describes a softening composition containing polymers of the same type, but which are crosslinked to a greater extent (70-300 ppm) and combined with a softener of quaternized ester type and with a fragrance.

The publication Research Disclosure No. 429116, from January 2000, relates to the preparation of cationic polymers in inverse emulsions and to their use as thickeners in various compositions, such as, for example, for fabric softeners.

Document WO 2005/053748 by the Applicant describes heavily crosslinked cationic polymers (>300 ppm), used as thickeners of aqueous compositions.

Patent application PCT/EP2009/050077, still by the Applicant, describes cationic polymers, in the form of an inverse emulsion, which are very heavily crosslinked and have a maximum insoluble material content of 15%. These polymers can be used in softening compositions.

Document WO 97/36981 describes softening compositions which are stable and viscous by combining an acrylic thickener, as described in document WO 90/12862, and an associative polymer of ethoxy/propoxy (EO/PO) surfactant type.

Documents EP 0 172 723 and EP 0 172 724 describe polymer compositions and an inverse emulsion polymerization process for preparing anionic or cationic, linear or crosslinked polymers containing hydrophobic groups having more than 8 carbon atoms.

Document US 2004/052746 describes in particular a softening composition comprising a polymer obtained by polymerization of the following four monomers:
 a vinyl monomer having a cationic or neutral amine group;
 a nonionic and hydrophobic vinyl monomer;
 an associative vinyl monomer; and
 a semihydrophobic vinyl surfactant monomer.

In addition, it is specified that the presence of the semihydrophobic vinyl surfactant monomer is essential for the stability of the emulsions comprising this copolymer.

Document EP 1 099 749 describes a softening composition comprising a neutral copolymer obtained by polymerization of:
 a monomer based on acrylic acid or methacrylic acid;
 a vinyl monomer; and
 an associative monomer.

Document WO 2005/087188 describes an anti-adhesive substance for cosmetic preparations comprising the neutral terpolymer obtained in particular by polymerization of:
 dimethylaminoethyl methacrylate;
 ethyl acrylate; and
 beheneth-25 methacrylate.

Document WO 97/22640 describes a foaming agent comprising a terpolymer obtained by polymerization of:
 a cationic monomer (DADMAC);
 a vinyl monomer comprising an amide group; and
 a vinyl monomer having a hydrophobic group and also a hydrophilic group.

Document U.S. Pat. No. 4,454,060 describes a liquid detergent composition comprising a copolymer that can be prepared from:
 an acrylamide-based monomer;
 a cationic monomer; and
 a monomer comprising a hydrophobic group.

Document EP 1 449 862 describes the use of a cationic polymer as a thickener in a cosmetic or pharmaceutical composition, as a thickener for printing pastes for the textile industry, as a thickener for industrial or household detergents or else in the petroleum industry. Said polymer comprises a cationic monomer, a neutral monomer and a nonionic surfactant monomer.

It should, however, be noted that documents WO 2005/087188, WO 97/22640, U.S. Pat. No. 4,454,060 and EP 1 449 862 do not therefore relate to softening compositions.

Although the thickeners used in the fabric softener compositions described in the prior art certainly make it possible to thicken the compositions, there is, however, a need to control the rheological profile of the formulation better and to obtain an increased stability of the composition.

Indeed, the viscosity of such a composition is influenced by a very large number of parameters:
 variable concentrations of softener (diluted to concentrated form);
 complex processes for use (agitation, temperature, batch or continuous, etc.);
 numerous regional specificities (South America, Asia, Europe, North America).

It is also necessary to improve the compatibility between the thickening polymers and the softeners and therefore the stability of the composition.

Document WO 2008/036587 describes an antiperspirant composition comprising a modified hydrophobic cationic polymer. This polymer can be obtained by polymerization of the following four monomers:
 a vinyl monomer;
 a hydrophobic nonionic vinyl monomer;
 an associative vinyl monomer; and
 a semihydrophobic surfactant vinyl monomer.

The present invention proposes to solve in particular the following technical problems:
 improvement of the stability of the softening compositions;
 increase in the thickening capacity of the polymers in the softening compositions, thus making it possible to significantly reduce the amount of polymer;

improvement of the rheological profile, regardless of the concentration of the softener.

SUMMARY OF THE INVENTION

According to the present invention, it has been discovered that, surprisingly, the selection of specific hydrophobic monomers for preparing a cationic polymer makes it possible to improve the rheological profile and the stability of softening compositions, compared with the polymers of the prior art.

In addition, these polymers are more compatible with the other ingredients contained in the softening compositions and in particular the softeners of quaternized ester type.

Finally, the use of this type of polymer makes it possible to significantly reduce the amount of polymer in the softening composition.

Without putting forward any theory, the Applicant explains these improvements: a better affinity between the hydrophobic parts of the cationic polymers (polymer/substrate interactions) and those of the softeners, and an interaction between the hydrophobic parts of the polymers themselves (polymer/polymer interactions).

More specifically, the present invention relates to a thickener containing a cationic polymer obtained by polymerization:
of at least one cationic monomer;
of at least one monomer with a hydrophobic nature, of formula (I):

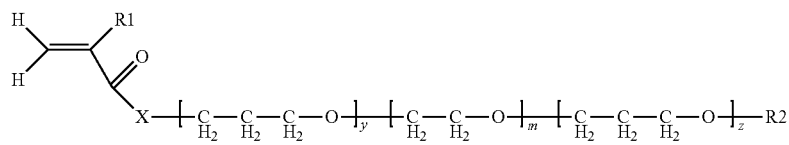

(I)

wherein
R1=H or CH3
R2=alkyl chain having at least 16 carbon atoms
X=O, m≥5, y=z=0, or
X=NH, m≥z≥5, y=0, or
X=NH, m≥y≥5, z=0;
optionally of at least one nonionic monomer and/or of at least one anionic monomer.

An alkyl chain is a saturated linear or branched acyclic hydrocarbon-based chain of general formula $C_nH_{2n+1}$.

In one preferred embodiment, the thickener according to the present invention comprises a cationic polymer, and more specifically a cationic terpolymer, obtained by polymerization:
of a cationic monomer;
of a monomer with a hydrophobic nature of formula (I):

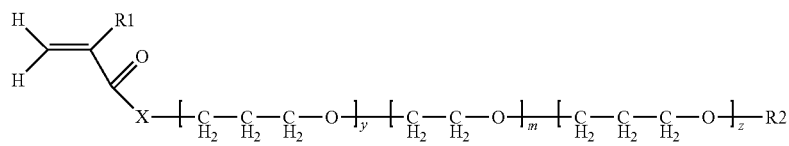

(I)

wherein
R1=H or CH3
R2=alkyl chain having at least 16 carbon atoms
X=O, m≥5, y=z=0, or
X=NH, m≥z≥5, y=0, or
X=NH, m≥y≥5, z=0;
of a nonionic monomer.

According to another advantageous embodiment, the thickener according to the present invention consists of said cationic terpolymer.

According to the invention, the cationic polymer may be crosslinked or non-crosslinked. When said polymer is crosslinked, the crosslinking is carried out optionally in the presence of a transfer agent in order to control the molecular weight.

The cationic monomers are advantageously chosen from the group comprising diallyldialkylammonium salts, such as diallyldimethylammonium chloride (DADMAC); acidified or quaternized salts of dialkylaminoalkyl acrylates and methacrylates, in particular of dialkylaminoethyl acrylate (ADAME) and of dialkylaminoethyl methacrylate (MADAME); acidified or quaternized salts of dialkyl-aminoalkylacrylamides or methacrylamides, such as, for example, methacrylamidopropyltrimethylammonium chloride (MAPTAC), acrylamidopropyltrimethylammonium chloride (APTAC) and the Mannich products, such as quaternized dialkylaminomethylacrylamides.

The acidified salts are obtained by means known to those skilled in the art, and in particular by protonation. The quaternized salts are also obtained by means known to those skilled in the art, in particular, by reaction with benzyl chloride, methyl chloride (MeCl), aryl chlorides, alkyl chlorides or dimethyl sulphate.

Advantageously, the content of cationic monomer represents between 25% by weight and 99.9% by weight relative to the weight of the cationic polymer, preferably between 50% by weight and 99.5% by weight.

The monomers with a hydrophobic nature, or hydrophobic monomers, are of formula (I). Mention will particularly be made of ethoxylated cetyl methacrylate (EO 25) and ethoxylated behenyl methacrylate (EO 25) and mixtures thereof.

More advantageously, the hydrophobic monomer is ethoxylated behenyl methacrylate (EO 25).

The term "EO 25" signifies that the monomer with a hydrophobic nature contains 25 ethoxy $CH_2$—$CH_2$—O units. In other words, m=25 for the compound according to the formula (I).

Preferably, the content of hydrophobic monomer represents between 0.1% by weight and 20% by weight relative to the weight of the cationic polymer, preferably between 0.5% by weight and 5% by weight.

As already indicated, the cationic polymer contained in the thickener according to the invention may be prepared by polymerization of at least one cationic monomer, of at least one monomer with a hydrophobic nature, and optionally of at least one nonionic monomer and/or of at least one anionic monomer.

The nonionic monomers are advantageously chosen from the group comprising acrylamide, methacrylamide, N-vinylmethylacetamide or N-vinylformamide, vinyl acetate, vinylpyrrolidone, methyl methacrylate or other acrylic esters, or other ethylenically unsaturated esters, or else other water-insoluble vinyl monomers, such as styrene or acrylonitrile.

Advantageously, the content of nonionic monomer represents between 0 and 74.9% by weight relative to the weight of the cationic polymer, more advantageously between 0 and 30% by weight.

The anionic monomers are advantageously chosen from the group comprising the salts of monomers having a carboxylic function in addition to a carbon-carbon double bond, such as, for example, acrylic acid salts, methacrylic acid salts, and the salts of monomers having a sulphonic acid function, such as, for example, 2-acrylamido-2-methylpropanesulphonic acid (ATBS) salts.

Preferentially, the content of anionic monomer represents between 0 and 50% by weight relative to the weight of the cationic polymer, preferably between 0 and 20% by weight.

In one particular embodiment, the cationic polymer contained in the thickener according to the invention may be obtained by polymerization:
of chloromethylated dimethylaminoethyl methacrylate;
of acrylamide; and
of ethoxylated behenyl methacrylate (EO 25).

In another particular embodiment, the cationic polymer contained in the thickener according to the invention may be obtained by polymerization:
of chloromethylated dimethylaminoethyl methacrylate;
of acrylamide; and
of ethoxylated cetyl methacrylate (EO 25).

As already stated, the cationic polymer according to the invention can be crosslinked in the presence of a crosslinking agent and optionally in the presence of a transfer agent.

The crosslinking agent is advantageously chosen from the group comprising: methylenebisacrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, compounds of glycidyl ether type, such as ethylene glycol diglycidyl ether, epoxies, or a mixture of these compounds.

Advantageously, the content of crosslinking agent represents between 0 and 10% by weight relative to the weight of the cationic polymer, preferably between 0 and 5% by weight.

The transfer agent, when it is present, is chosen from the group comprising: isopropyl alcohol, sodium hypophosphite, mercaptoethanol or a mixture of these compounds.

Advantageously, the content of transfer agent represents between 0 and 5% by weight relative to the weight of the cationic polymer, preferably between 0 and 2% by weight.

The constituent cationic polymer of the thickener according to the present invention can be in liquid or solid form. It can be prepared by dispersion polymerization, by inverse emulsion polymerization, by microemulsion polymerization, or by gel polymerization, it being possible for the polymer obtained to be subsequently dried and isolated in order to have a powder.

In one particular embodiment, the cationic polymer is in the form of an inverse emulsion comprising an oily phase, an aqueous phase, at least one water-in-oil (W/O) emulsifier, at least one oil-in-water (O/W) emulsifier. The inverse emulsion generally comprises from 20% to 60% by weight, and preferably from 40% to 55% by weight, of linear, branched or crosslinked cationic polymer.

The term "water-in-oil emulsifier" is intended to mean emulsifiers which have an HLB value that is sufficiently low to provide water-in-oil emulsions, such as the surfactant polymers sold under the name Hypermer® or such as sorbitan extracts, for instance sorbitan monooleate or sorbitan isostearate.

The term "oil-in-water emulsifier" is intended to mean emulsifiers which have an HLB value that is sufficiently high to provide oil-in-water emulsions, such as ethoxylated sorbitan esters, for instance ethoxylated sorbitan oleate with 20 equivalents of ethylene oxide (EO 20).

In the particular embodiment constituted by the inverse emulsion, as described previously, the copolymerization of the precursor monomers is carried out at a pH greater than 4 and preferably between 4 and 6.

The inverse emulsion generally contains from 1% to 10% by weight, and preferably from 2.5% to 9% by weight, of water-in-oil (W/O) emulsifiers and from 2% to 10% by weight, and preferably from 2.5% to 6% by weight, of oil-in-water (O/W) emulsifiers.

The inverse emulsion contains an oily phase representing from 15% to 40%, preferably from 20% to 25% of its total weight.

This oily phase can be either a commercial mineral oil containing saturated hydrocarbons of paraffinic, isoparaffinic or cycloparaffinic type, having at ambient temperature a density of between 0.7 and 0.9, or a vegetable oil, or a synthetic oil, or a mixture of several of these oils.

The inverse emulsion contains between 2% and 40% of water. It can also contain various additives, such as complexing agents, transfer agents or chain-limiting agents.

The process for preparing the inverse emulsion as previously defined is carried out according to the following steps:
a) an aqueous solution containing the monomers and the optional additives is emulsified in an oily phase in the presence of one or more water-in-oil emulsifiers,
b) the polymerization reaction is initiated by introducing, into the emulsion formed in a), a free radical initiator system and then the reaction is allowed to take place,
c) when the polymerization reaction is finished, one or more oil-in-water emulsifiers are introduced at a temperature below 50° C.

According to one variant of this process, the reaction medium resulting from step b) is concentrated by distillation, before step c) is carried out.

According to another variant of this process, the reaction medium resulting from step b) is completely dried. In this case, step c) is not carried out.

According to another preferred implementation of the process, the pH of the starting aqueous solution is adjusted to a pH greater than or equal to 4 before step c) is carried out.

As already stated, it is also possible to concentrate or isolate the cationic polymer contained in the thickener according to the invention by any of the techniques known to those skilled in the art. There are in particular, numerous processes for obtaining a powder from inverse emulsions of polymers, which consist in isolating the active material from the other constituents of the emulsion, such as, for example:
- precipitation from a nonsolvent medium, such as acetone, methanol or any other polar solvent in which the cationic polymer is not soluble. Simple filtration then makes it possible to isolate the polymer particle;
- azeotropic distillation in the presence of an agglomerating agent and of stabilizing polymer makes it possible to produce agglomerates that are easily isolated by filtration before drying the particle;
- "spray-drying" consists in creating a cloud of fine emulsion droplets in a stream of hot air for a controlled period of time.

The polymers of the invention, obtained in the form of a powder by any one of the techniques described above, have the main advantage of being proposed without solvent. They will therefore be quite particularly suitable for compositions which are highly sensitive to residual odour, regulatory and/or toxicological profile problems.

The Applicant has discovered, surprisingly, that the use of these specific polymers makes it possible to significantly improve the compatibility with softeners comprising a hydrophobic sequence. It also makes it possible more successfully to stabilize these softening compositions, in particular at acidic pH and in dispersed systems, and to develop viscosity profiles thus far difficult to envisage.

The selection of certain hydrophobic monomers according to the formula (I) and the polymerization thereof with the cationic monomers is responsible for these unexpected properties.

Another subject of the present invention is therefore a softening composition comprising at least one thickener as previously described and also at least one softener.

DETAILED DESCRIPTION OF AN EMBODIMENT OF THE INVENTION

According to one preferred embodiment, the present invention relates to a softening composition comprising at least one thickener containing a cationic polymer, and more specifically a cationic terpolymer, obtained by polymerization:
- of a cationic monomer;
- of a monomer with a hydrophobic nature, of formula (I):

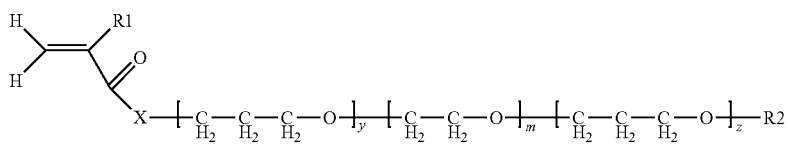

(I)

wherein
R1=H or $CH_3$
R2=alkyl chain having at least 16 carbon atoms
X=O, m≥5, y=z=0, or
X=NH, m≥z≥5, y=0, or
X=NH, m≥y≥5, z=0;
of a nonionic monomer.

According to another preferred embodiment, the present invention relates to a softening composition comprising at least one thickener consisting of a cationic terpolymer obtained by polymerization:
- of a cationic monomer;
- of a monomer with a hydrophobic nature, of formula (I):

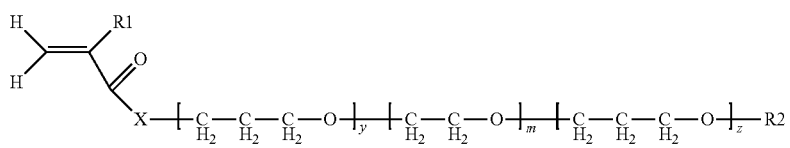

(I)

wherein
R1=H or $CH_3$
R2=alkyl chain having at least 16 carbon atoms
X=O, m≥5, y=z=0, or
X=NH, m≥z≥5, y=0, or
X=NH, m≥y≥5, z=0;
of a nonionic monomer.

The softening compositions, into which the polymers of the invention are introduced, are used during or after the washing of textile materials. They are applied during washing, generally at the stage of the rinse cycle, where they are added to the rinsing water, or during the drying cycle, where they are used dry, for example, as an impregnation agent on a woven or nonwoven fabric strip.

Advantageously, the content of thickener in the softening composition represents 0.05% to 10% relative to the weight of the softening composition or, preferably, 0.1 to 5%.

The textile material softening compositions are aqueous compositions containing softeners of quaternized ester type. These molecules are not soluble in water. They have a cationic nature. They have a hydrophilic part for affinity with the textile substrate, cellulose fibres, and a hydrophobic part (a long alkyl chain) which provides the softening function by lubrication.

Any cationic substance which is substantive when rinsing with water on the textile, and which is capable of making the textile soft, can be used as softener. A large number of these substances are known and comprise quaternary compounds as follows:

(i) alkyl methyl quaternary ammonium compounds which have either one $C_{18}$ to $C_{24}$ alkyl chain or two C12 to C30 alkyl chains, the long-chain alkyl groups being most commonly derived from hydrogenated tallow. Examples of these compounds are ditallow dimethyl ammonium chloride, ditallow dimethyl ammonium methylsulphate, tallow trimethyl ammonium chloride, dieicosyl dimethyl ammonium chloride, tallow dimethyl(3-tallow alkoxypropyl)ammonium chloride, ditetradecyl dimethyl ammonium chloride, didodecyl diethyl ammonium acetate and tallow trimethyl ammonium acetate, (ii) amido alkoxylated quaternary ammonium compounds. Quaternary compounds of this type can be prepared starting from fatty acids or triglycerides and from an amine, for example diethylenetriamine. The product is then alkoxylated with ethylene oxide or propylene oxide and is quaternized with dimethyl sulphate, (iii) quaternized amidoimidazolines. Compounds of this type can be obtained by heating the alkoxylated product of the reaction of an amine and of a fatty acid or of a triglyceride as described for type (ii) in order to carry out the cyclization giving the imidazoline. The latter is then quaternized by reaction, for example, with dimethyl sulphate. An example of a compound of type (iii) is 2-heptadecyl-1-methyl-1-(2'-stearoylamidoethyl)imidazolinium methyl sulphate, (iv) polyamine salts and polyalkyleneimine salts, (v) alkylpyridinium salts, for example, cetylpyridinium chloride.

The cationic softeners generally preferred are those which contain long-chain fatty alkyl groups derived from tallow or from hydrogenated tallow and the class of softeners generally preferred is that of type (i), i.e. the alkyl dimethyl ammonium compounds.

The compositions can contain other optional ingredients, for example, emulsifiers for polyorganosiloxanes, fragrances, optical brighteners and dyes. Particularly preferred optional ingredients of aqueous fabric softener compositions are certain nonionic emulsifiers, such as fatty acid esters of monoalcohols and polyalcohols, for example glyceryl monostearate, sorbitan monolaurate and sorbitan monooleate. These esters can be used in proportions that are conventional for softening compositions, preferably from approximately 1 to 5% of the weight of the aqueous composition.

Those skilled in the art will be able to choose the best combination of monomers, crosslinking and/or transfer agents and polymerization conditions according to their own knowledge and to the present description, and also to the following examples.

Exemplary Embodiments of the Invention

Synthesis and evaluation in a softening formulation
A. Cationic Polymer Synthesis:

EXAMPLE 1 P1

An aqueous phase of water-soluble monomers is prepared by mixing the following compounds:
6.0% by weight of acrylamide at 50%
46.8% by weight of chloromethylated dimethylaminoethyl methacrylate at 75%
1.3% by weight of ethoxylated behenyl methacrylate (EO 25)
0.03% by weight of diethylenetriaminepentaacetic acid, pentasodium salt
0.05% by weight of sodium hypophosphite
0.02% by weight of methylenebisacrylamide
13.3% by weight of deionized water
the pH is adjusted to between 4.0 and 6.0 with citric acid.

An organic phase is prepared by adding the following compounds:
2.0% by weight of sorbitan monooleate
5.5% by weight of a stabilizing amphiphilic polymer
19.0% by weight of white mineral oil
6.0% by weight of light isoparaffinic light mineral oil.

The two phases are mixed in a 1 L stirred reactor, with the aqueous phase being poured into the organic phase, and then they are subjected to a strong shear (of rotor stator type) for 1 minute in order to form a water-in-oil emulsion. This emulsion is then deoxygenated by bubbling nitrogen for 30 minutes.

The polymerization is carried out by simple addition of a redox couple of the type sodium metabisulphite and tert-butyl hydroperoxide in solution in water.

After having reached the maximum polymerization temperature (adiabatic polymerization) the emulsion is maintained at 65° C. for 1 h.

Vacuum distillation makes it possible to remove the water and the volatile light oil so as to obtain a final concentration of polymer of approximately 58%.

The final step consists in adding an oil-in-water surfactant: 6.0% by weight of ethoxylated fatty alcohol (trideceth-6) is added to 100% by weight of distilled products.

COUNTER EXAMPLE 1 CP1

The protocol of Example 1 is reproduced without ethoxylated behenyl methacrylate (EO 25).

EXAMPLE 2 P2

Example 1 is reproduced in the absence of the crosslinking agent, methylenebisacrylamide.

COUNTER EXAMPLE 2 CP2

Example 1 is reproduced in the absence of crosslinking agent and in the absence of ethoxylated behenyl methacrylate (EO 25).

EXAMPLE 3 P3

Example 1 is reproduced with the ethoxylated behenyl methacrylate (EO 25) being replaced with ethoxylated cetyl methacrylate (EO 25).

COUNTER EXAMPLE 3 CP3

Example 1 is reproduced, but with the ethoxylated behenyl methacrylate being replaced with ethoxylated dodecyl methacrylate (EO 25).

B. Preparation of a Softening Formulation Based on Quaternized Esters 94.5% by weight of deionized water at 50° C. is charged to a stirred reactor (150 rpm). 5.5% by weight of quaternized esters (Stepantex VK-90) are then dispersed. After 15 minutes, the mixture is cooled to ambient temperature and the pH is adjusted to 3.5 with citric acid.

The viscosity of the base obtained is then measured with a Brookfield RVT viscometer, 10 rpm, 25° C. The value is 160 cps.

0.5% by weight of cationic polymer obtained from the examples of part A, is then added with stirring (350 rpm), until a homogeneous solution is obtained.

The viscosity of the final product obtained is then measured with a Brookfield RVT viscometer, 10 rpm, 25° C.

Results:

| Nature of the formulation | Apparent viscosity* Brookfield RVT, 10 rpm | Apparent viscosity** Brookfield RVT, 10 rpm |
|---|---|---|
| Base "alone" | 160 | 120 |
| Base + 0.5% P1 | 1250 | 1450 |

-continued

| Nature of the formulation | Apparent viscosity* Brookfield RVT, 10 rpm | Apparent viscosity** Brookfield RVT, 10 rpm |
|---|---|---|
| Base + 0.5% CP1 | 510 | 450 |
| Base + 0.5% P2 | 2600 | 2950 |
| Base + 0.5% CP2 | 300 | 250 |
| Base + 0.5% P3 | 1050 | 1250 |
| Base + 0.5% CP3 | 320 | 280 |
| Base + 0.5% Ciba ®RHEOVIS ®FRC | 480 | 450 |

*1 h after obtaining a homogeneous formulation, measurement carried out at 25° C.
**After 1 month in an incubator at 50° C., measurement carried out at 25° C.

The polymers of the invention P1, P2 and P3 therefore make it possible to significantly increase the viscosity of a softening composition and its stability over time.

What is claimed is:

1. A method for softening laundry comprising the following steps:
providing a softening composition comprising at least one textile softener and at least one thickener, the at least one thickener containing a cationic terpolymer obtained by polymerization:
of a cationic monomer;
of a monomer with a hydrophobic nature, of formula (I):

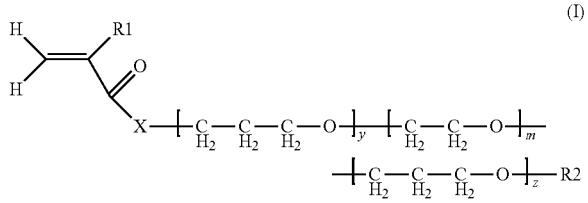

(I)

wherein
R1=H or $CH_3$
R2=alkyl chain having at least 16 carbon atoms
X=NH, m≥z≥5, y=0, or
X=NH, m≥y≥5, z=0;
of a nonionic monomer; and
applying the softening composition to at least one textile material during a laundering process.

2. The method of claim 1 further comprising the step of washing the at least one textile material as part of the laundering process and wherein said step of applying the softening composition is performed simultaneously with said washing step.

3. The method of claim 1 further comprising the step of washing the at least one textile material as part of the laundering process and wherein said step of applying the softening composition is performed subsequent to said washing step.

4. The method of claim 1, wherein the thickener consists of a cationic terpolymer obtained by polymerization:
of a cationic monomer;
of a monomer with a hydrophobic nature, of formula (I):

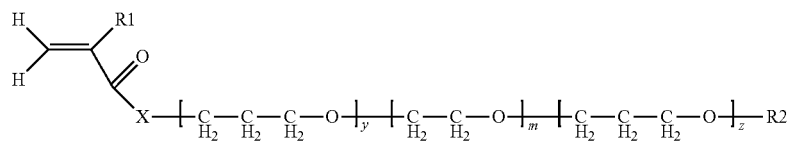

(I)

wherein
R1=H or $CH_3$
R2=alkyl chain having at least 16 carbon atoms
X=NH, m≥z≥5, y=0, or
X=NH, m≥y≥5, z=0;
of a nonionic monomer.

5. The method of claim 1, wherein a content of hydrophobic monomer represents between 0.1% by weight and 20% by weight relative to the weight of the cationic polymer.

6. The method of claim 5, wherein the content of hydrophobic monomer represents between 0.5% by weight and 5% by weight relative to the weight of the cationic polymer.

7. The method of claim 1, wherein the cationic monomer is selected from the group consisting of: diallyldialkylammonium salts; acidified or quaternized salts of dialkylaminoalkyl acrylates and methacrylates; and acidified or quaternized salts of dialkyl-aminoalkylacrylamides or methacrylamides.

8. The method of claim 7, wherein the cationic monomer is diallyldimethylammonium chloride (DADMAC).

9. The method of claim 7, wherein the cationic monomer is selected from the group consisting of acidified or quaternized salts of dialkylaminoethyl acrylate (ADAME) and acidified or quaternized salts of dialkylaminoethyl methacrylate (MADAME).

10. The method of claim 1, wherein a content of cationic monomer represents between 25% by weight and 99.9% by weight relative to the weight of the cationic polymer.

11. The method of claim 10, wherein a content of cationic monomer represents between 50% by weight and 99.5% by weight relative to the weight of the cationic polymer.

12. The method of claim 1, wherein the cationic polymer is crosslinked in the presence of a crosslinking agent selected from the group consisting of: methylenebisacrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, compounds of glycidyl ether type, epoxies, and mixtures of these compounds.

13. The method of claim 12, wherein the cationic polymer is crosslinked in the presence of a transfer agent selected from the group consisting of isopropyl alcohol, sodium hypophosphite, mercaptoethanol and mixtures of these compounds.

14. The method of claim 1, wherein the cationic polymer is obtained by inverse emulsion polymerization.

15. The method of claim 1, wherein the cationic polymer is in the form of an inverse emulsion comprising an oily phase, an aqueous phase, at least one water-in-oil (W/O) emulsifier, at least one oil-in-water (O/W) emulsifier and from 20% to 60% by weight of said cationic polymer.

16. The method of claim 1, wherein a content of thickener represents 0.05% to 10% relative to the weight of the softening composition.

\* \* \* \* \*